United States Patent [19]

Inoue et al.

[11] Patent Number: 5,500,296
[45] Date of Patent: Mar. 19, 1996

[54] MAGNETIC RECORDING MEDIUM, PROCESS FOR PRODUCING MAGNETIC RECORDING MEDIUM, APPARATUS FOR PRODUCING MAGNETIC RECORDING MEDIUM, AND MAGNETIC RECORDING APPARATUS

[75] Inventors: Youichi Inoue, Ryugasaki; Yoshihiro Sato, Ibaraki; Shinichi Hirose, Tsukuba; Hiroshi Tani, Atsugi; Katsuyuki Tanaka, Ibaraki; Katsuo Abe; Masaki Ohura, both of Odawara; Muneo Mizumoto, Tsuchiura, all of Japan

[73] Assignee: Hitachi, Ltd., Tokyo, Japan

[21] Appl. No.: 183,900

[22] Filed: Jan. 21, 1994

Related U.S. Application Data

[63] Continuation of Ser. No. 903,979, Jun. 26, 1992, abandoned, and a continuation-in-part of Ser. No. 28,600, Mar. 8, 1993, abandoned, which is a continuation of Ser. No. 582,368, Sep. 12, 1990, abandoned.

[30] Foreign Application Priority Data

Sep. 20, 1989 [JP] Japan ................................ 1-242233
Jun. 26, 1991 [JP] Japan ................................ 3-154351

[51] Int. Cl.⁶ ........................... B32B 9/00; B32B 27/00; G11B 5/66; C23C 14/00
[52] U.S. Cl. ................... 428/408; 428/421; 428/610; 428/634 T; 428/634 TP; 428/694 TC; 428/694 TF; 428/694 TR; 428/695; 428/900; 204/192.2; 204/192.34; 204/192.1
[58] Field of Search ................. 428/634 T, 634 TP, 428/634 TC, 634 TF, 634 TR, 900, 408, 695, 610, 421; 204/192.2, 192.34, 192.1

[56] References Cited

U.S. PATENT DOCUMENTS

| | | | |
|---|---|---|---|
| 4,717,622 | 1/1988 | Kurokawa | 428/408 |
| 4,840,844 | 6/1989 | Futamoto | 428/336 |
| 4,861,662 | 8/1989 | Koblisko | 428/408 |
| 4,880,687 | 11/1989 | Yokoyame | 428/141 |
| 4,889,767 | 12/1989 | Yokoyame | 428/336 |
| 5,118,577 | 6/1992 | Brar | 428/409 |
| 5,227,211 | 7/1993 | Eltoukhy | 428/64 |
| 5,275,850 | 1/1994 | Kitoh | 427/577 |

FOREIGN PATENT DOCUMENTS

WO88/05953  8/1988  WIPO.

OTHER PUBLICATIONS

Japanese Patent Application Kokai No. H. 2-208827 T. Takahashi Aug. 20, 1990.
Ibid. No. H. 1-263913 K. Shinohane Oct. 20, 1989.

*Primary Examiner*—Leszek Kiliman
*Attorney, Agent, or Firm*—Antonelli, Terry, Stout & Kraus

[57] ABSTRACT

The present invention provides a magnetic recording medium wherein the surface layer of the protective film of the medium is irradiated by ions to give a protective film having high reliability in resistance to sliding with the magnetic head, a process for producing the medium, an apparatus for producing the medium, and a magnetic recording apparatus having the medium mounted therein. The essentials of the present invention lie in introducing a minute surface roughness of atomic order in the surface of the protective film 5 constituting the outermost layer of a magnetic recording medium by irradiating atoms accelerated by high voltage (that is, by implanting ions) to the surface.

8 Claims, 5 Drawing Sheets

MAGNETIC RECORDING MEDIUM, PROCESS FOR PRODUCING MAGNETIC RECORDING MEDIUM, APPARATUS FOR PRODUCING MAGNETIC RECORDING MEDIUM, AND MAGNETIC RECORDING APPARATUS

This application is a continuation-in-part of application Ser. No. 07/903,979, filed Jun. 26, 1992, now abandoned, and is a continuation-in-part of application Ser. No. 08/028,600, filed Mar. 8, 1993, now abandoned, the contents of which are incorporated herein by reference, which is a continuation of application Ser. No. 07/582,368, filed Sep. 12, 1990, now abandoned.

BACKGROUND OF THE INVENTION

1. Field of the Invention

The present invention relates to a magnetic recording medium, a process for producing a magnetic recording medium, an apparatus for producing a magnetic recording medium, and a magnetic recording apparatus. More particularly, the invention relates to a magnetic recording medium having a protective film excellent in resistance to sliding with magnetic heads, a process for producing the magnetic recording medium, an apparatus for producing the magnetic recording medium, and a magnetic recording apparatus provided with the magnetic recording medium.

2. Description of the Prior Art

In the field of magnetic recording media, with the recent trend toward higher density of magnetic recording, recording media provided with thin film of Co-Ni-based or Co-Cr-based magnetic metals, comprising Co as the main component, formed by sputtering or plating are in increasingly wide use in practice in place of prior ones which use iron oxide. Such a newer recording medium has a film structure comprising, usually on an aluminum alloy substrate, a NiP plating film, a Cr undercoating film, the aforementioned magnetic film and a non-magnetic protective film, formed in the abovementioned order. When the surface of the film is too smooth, an adsorptive force will develop between the film and the magnetic head during stoppage, which involves the risk of making it impossible to start up the rotation of a spindle motor on which the recording medium has been mounted, or causing breakage of the magnetic head support system. Therefore, a so-called texture finishing is commonly applied, in which the surface is deliberately roughened to impart surface roughness to the surface. In one method of such texture finishing, as disclosed in Japanese Patent Application Kokai (Laid-Open) No. 2-208827, for example, the film is subjected to dry etching under DC bias voltage in an inert gas, whereby fine working is applied only to the protective film to obtain uniform surface roughness while the magnetic film is kept smooth as before. In another method, as disclosed in Japanese Patent Application Kokai (Laid-Open) No. 1-263913, island-like protuberences of nitride are arranged on the magnetic film and further a film of diamond-like carbon is provided.

The dry etching processing under DC bias voltage in inert gas have problems in that, in the etching of the surface, some of the surface structures are etched selectively, or even when the surface texture obtained is initially good, the surface characteristic is readily deteriorated by abrasion. On the other hand, the processing which comprises arranging island-like substances on the magnetic film involves the problems of having difficulty in securing reliable adhesion between the substance which forms the islands and the protective carbon film and of complication of process steps.

SUMMARY OF THE INVENTION

The present invention has been attained in view of the above-mentioned situations. One object of the present invention is to form a surface texture while keeping the adhesiveness and strength of the protective film, thereby to obtain a magnetic recording medium having a high sliding resistance reliability. Another object of the present invention is to provide a process for producing a magnetic recording medium excellent in sliding resistance reliability and an apparatus used therefor. Still another other object of the present invention is to provide a magnetic recording apparatus having the magnetic recording medium excellent in sliding resistance mounted therein.

The first object mentioned above can be attained by irradiating to the protective film surface ions which have been accelerated by a high voltage of 4 kV or more or atoms formed by electrical neutralization on the ions, to form minute surface roughness of the level of atomic magnitude. The another object mentioned above can be attained by providing in a vacuum chamber an ion irradiation means for irradiating ions to the surface of the protective film formed by sputtering. The still another object mentioned above can be attained by mounting a magnetic recording medium having a rough surface formed on the protective film surface by ion irradiation, with a rotary shaft on a base.

When atoms are ionized, then accelerated in an electric field of several kV or more and irradiated to the surface of a solid, they collide with atoms in the solid. Though a part of the atoms is reflected at the surface, the remainder of the atoms will stop at certain positions after repeating collision and scattering. Thus, the atoms are implanted into the material. It is known that ions accelerated by such high voltage can cause dislocation of atoms as the result of collision of atomic nuclei with one another, to improve the strength and hardness of the solid material itself. The present inventors have found, on close observation of the surface, that ups and downs of the order of several nm are formed at this time. Accordingly, by optimizing the conditions of irradiation, textures can be introduced onto the film surface, and hardening of the protective film and the improvement of adhesiveness thereof with the magnetic film, etc., can be accomplished at the same time. Resultantly, a surface having markedly enhanced resistance to sliding can be formed.

Other objects, features and advantages of the present invention will become apparent from the Examples described below.

DETAILED DESCRIPTION OF THE PREFERRED EMBODIMENTS

The first Example of the present invention will be described below with reference to FIGS. 1, 2, 3, 4, 5 and 6 and Tables 1, 2 and 3.

Figure 6:
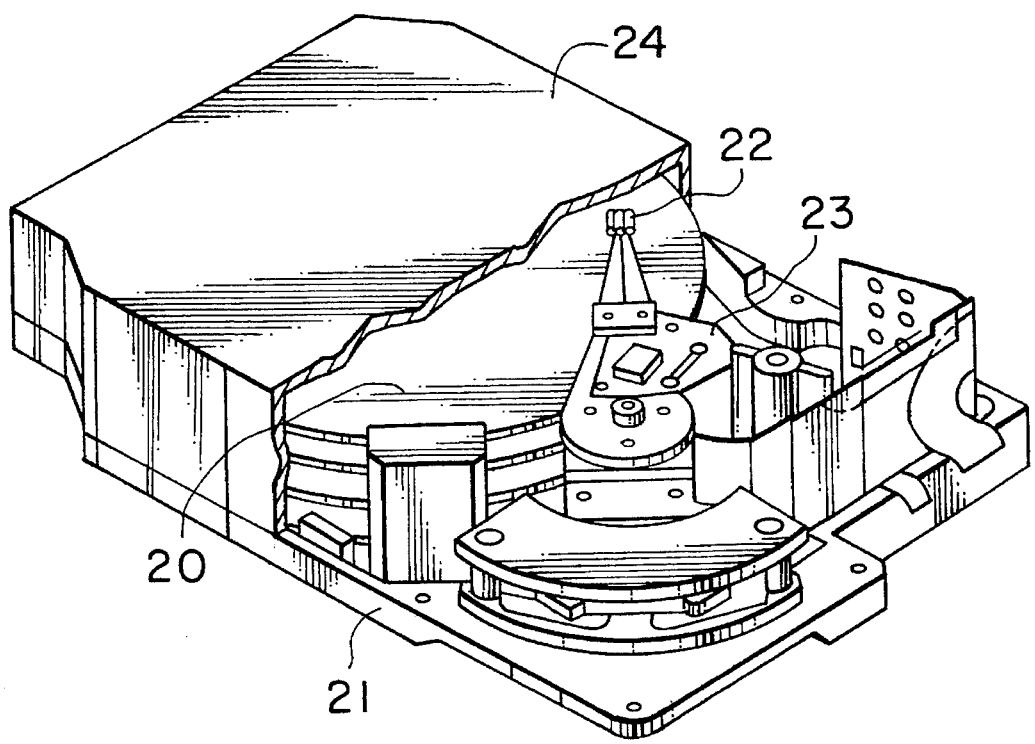
FIG. 6 is a perspective view of a magnetic recording apparatus having the magnetic recording medium of the first Example mounted therein.

FIG. 6 is a perspective view of a magnetic recording apparatus having the magnetic recording medium of the present invention mounted therein. A magnetic disk 20, which is a magnetic recording medium for recording and playing back of data, is mounted on a spindle driven rotationally, and is placed on a base 21. On the other hand, a magnetic head for recording and playing back of data is attached to the rear end of a dynamic pressure slider 22. The magnetic head is attached to the tip of an oscillation-type actuator 23 capable of positioning the head at any desired point of the radius of the disk. Since the head is susceptible to the effect of minute floating dust, a cover 24 of nearly closed structure equipped with a dust filter is provided. In this apparatus, though the magnetic head is in contact with the magnetic disk during stoppage, the head floats above the disk after contact-sliding for a while in start up. The head slides in contact with the disk also at the stop of running. This system is usually called CSS (Contact Start and Stop). Therefore, the magnetic disk surface is desired to have a high sliding resistance. In the present Example, for this reason, a magnetic disk to the surface of which an optimum minute roughness has been introduced is mounted, whereby a magnetic recording apparatus having a high sliding resistance reliability is obtained.

Figure 1:
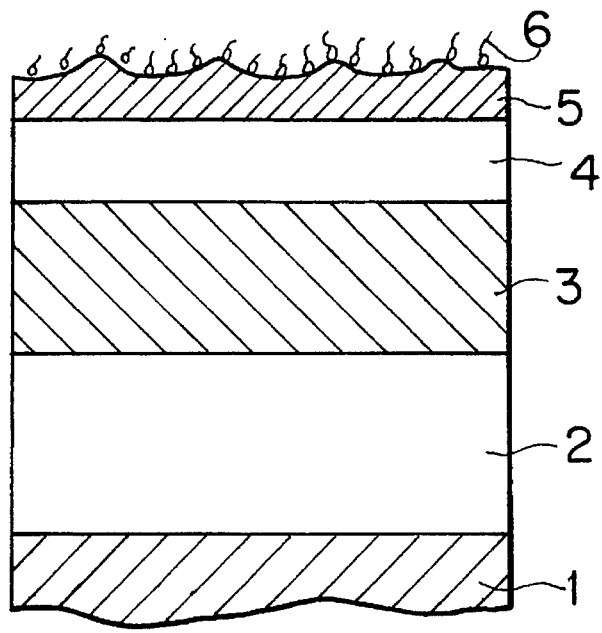
FIG. 1 is a sectional view of a magnetic recording medium of the first Example.

The film structure of the magnetic disk 20, a recording medium, is shown in FIG. 1. The film comprises, on an Al substrate 1, a NiP plating undercoat film 2 of 10–20 μm thickness, an intermediate Cr film 3 of 40–300 nm thickness thereon, a Co-Cr based magnetic film 4 of 30–60 nm thickness thereon and a carbon based protective film 5 of 10–50 nm thickness further thereon, respectively formed by sputtering, and a perfluoropolyether based lubricant 6 further coated thereon.

Figure 2:
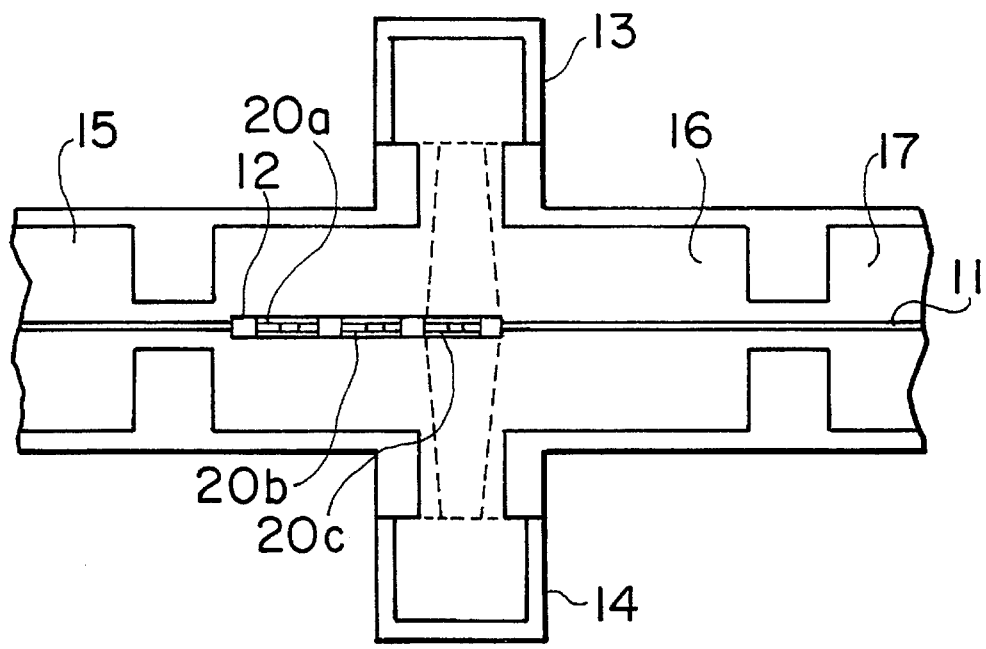
FIG. 2 is a layout drawing showing an apparatus for production of the first Example.
Figure 3:
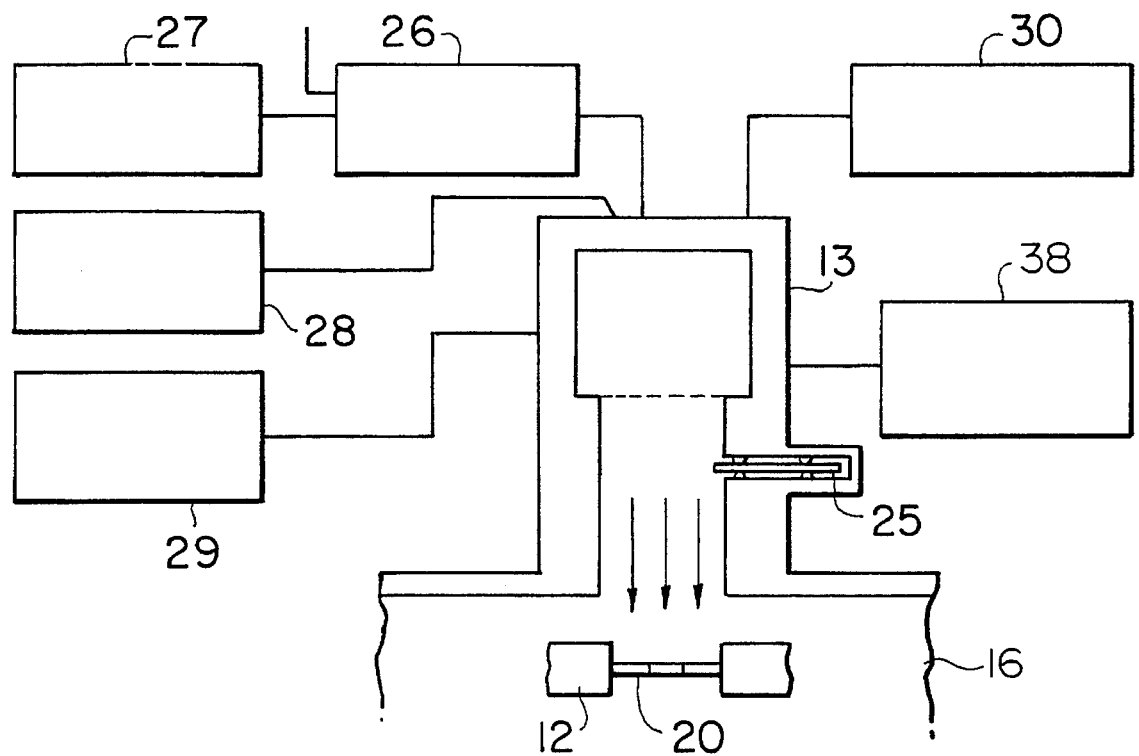
FIG. 3 is a sectional view showing the inside of the ion irradiation source shown in FIG. 2.

The structure and the layout of an apparatus for producing a magnetic recording medium are described with reference to FIG. 2. On the left side of the drawing, is a sputtering film-forming chamber 15 for forming the films up to and including the protective carbon film of the magnetic recording medium shown in FIG. 1. An ion irradiation chamber 16 is provided to be connected in line with the chamber 15, and further on the right side of the chamber 16, is a carrying-out chamber 17 for taking out a sample. Herein, the high voltage-accelerated ion irradiation is sometimes called "ion implantation" from the viewpoint of its function of material modification.

Magnetic disks 20a, 20b and 20c each of a diameter of 5.25 inches, which are recording media, can be attached or detached as desired to or from a pallet 12 which acts as a holding means and is capable of moving through a moving means on a rail 11 laid passing through these chambers. The sample is sent from the left-side sputtering film-forming chamber 15 into the ion irradiation chamber 16 kept at a degree of vacuum of about $10^{-5}$ Torr and further transferred to the carrying-out chamber 17 used for taking out the sample. When the pallet 12 carrying the sample thereon comes in front of ion sources 13 and 14, nitrogen ions are accelerated and irradiated from both sides. The ions to be irradiated may be, besides nitrogen ions, oxygen ions, argon ions or silicon ions. The structure of the ion sources 13 and 14 are described below with reference to FIG. 3. In the ion irradiation chamber 16 connected to a vacuum pump 38 is placed the magnetic disk 20 attached to the pallet 12 of rectilinear transport type, and the ion source 13 is constructed such that ions can be irradiated to the entire surface of the magnetic disk from the ion source 13 by opening a gate valve 25. In the ion source, the gas in a gas container 27 is supplied through a gas controller 26 and ionized with a filament power source 28. The ions formed are accelerated with an accelerating power source 29. This apparatus is constructed such that when different species of ions are to be irradiated successively, desired species of ions can be irradiated by changing the inlet port of the gas controller 26. Further, a cooling apparatus 30 of pure water for preventing charge-up is attached since the ion source generates much heat. When the gate valve 25 is opened, irradiation ions can be irradiated from the ion source 13 to the magnetic disk 20. The sample is subjected to the irradiation treatment while moving at a rate of about 1 mm/sec. The conditions for the treatment in the first Example are: nitrogen atom irradiation, acceleration voltage of 10 kV, irradiation time of 100 sec, ion electrode current of 100 mA, and the degree of vacuum before the treatment of $1 \times 10^{-5}$ Torr. Though heat is generated during irradiation, the temperature rise is about 120° C. and exerts utterly no effect on the magnetic characteristic of the magnetic film. After the film has been formed, a perfluoropolyether based lubricant is coated on the film surface.

Figure 4:
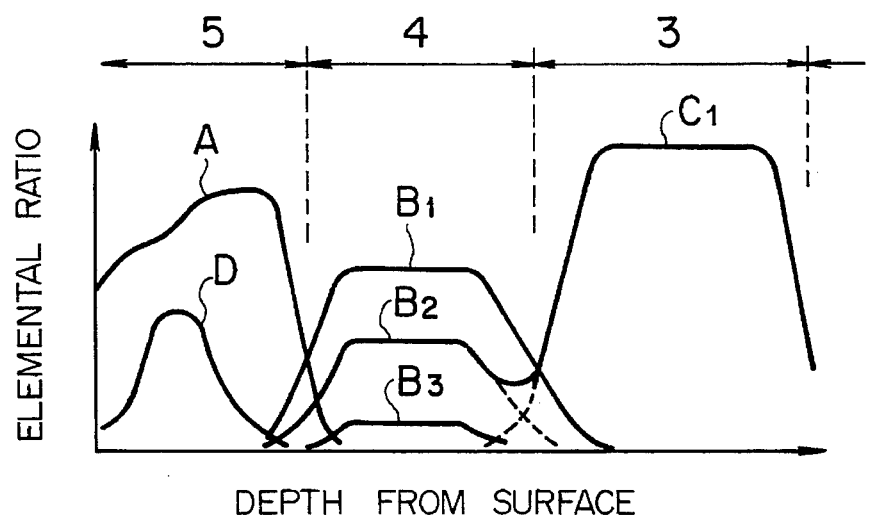
FIG. 4 is a graph showing the results of determination of surface roughness in relation to the irradiation treatment conditions in the first Example.
Figure 5:
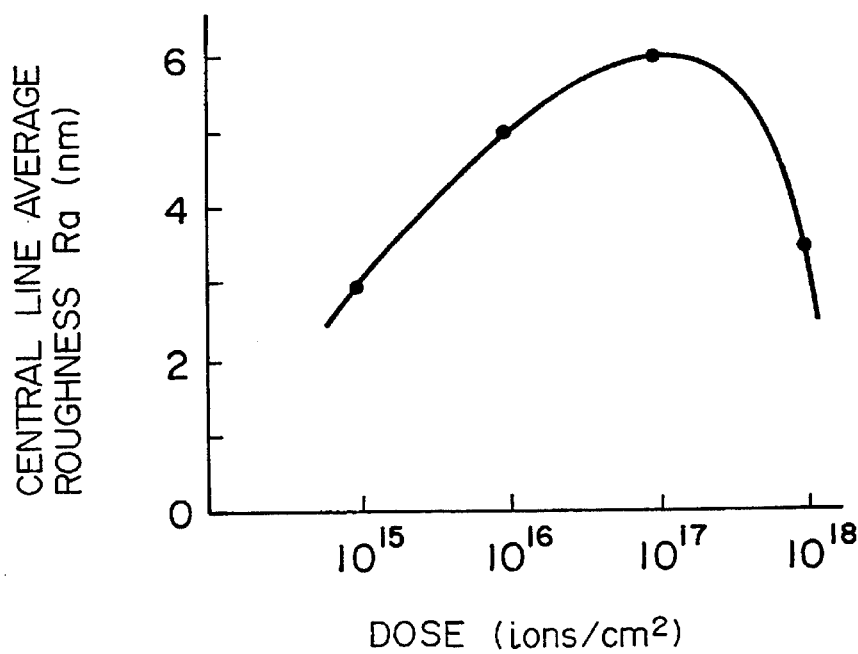
FIG. 5 is a graph showing the result of analysis of the composition in the depth direction of the magnetic recording medium of the first Example.

The recording medium thus prepared was analyzed for its composition in the direction of depth, and the results are described below with reference to FIG. 4. When ions are irradiated, they split basically into atoms sprung out by sputtering and atoms which penetrate to the inside. Consequently, while the atoms form a minute configuration on the surface, the atoms which have penetrated to the inside remain there. Thus, the results of analysis of the recording medium in the depth direction are explained with reference to FIG. 4. Usually, an elemental analysis is conducted by means of Auger electron spectroscopy (AES) or secondary ion mass spectroscopy (SIMS) while dry-etching the surface. In FIG. 4, the ordinate represent the detection intensities of respective elements, and the abscissa represent the etching times from the surface, that is, the depths from the surface. The maximum concentration depth (i.e., medium depth of distribution) of the elements constituting the respective films are indicated by A, B, C and D. A indicates the maximum concentration depth (medium depth of distribution) of the element constituting a protective film 5; $B_1$, $B_2$ and $B_3$ respectively indicate that of cobalt, chromium and other additive elements constituting a magnetic film 4, and C indicates that of chromium of the intermediate film 3. D indicates the irradiated element which has not been reflected at the surface and has penetrated to the inside and remained there. Therefore, in the case of a magnetic film B, which is an alloy layer, the curves $B_1$, $B_2$ and $B_3$ have shapes similar to one another and have equal maximum concentration depths (median depths of distribution), though the concentrations themselves may differ from one another. As contrasted, the distribution of the element used for irradiation of the protective film is featured by being different from the initial distribution of the elements constituting the protective film. Nextly, the results of determination of surface roughness of a medium obtained when the ion irradiation quantity (i.e., dose) is varied are shown in FIG. 5. The central line average surface roughness determined with STM is plotted as ordinate and the ion irradiation quantity (dose) is plotted as abscissa. In the irradiation, the carbon film reduces its thickness by several tens of percent owing to the effect of sputtering, as compared with the film before the irradiation treatment, and a minute texture of the order of several nm is introduced to its surface. The surface roughness, which is initially about 1.5 nm, increases, with the increase of dose, to about 3 nm at a dose of $10^{15}$ ions/cm$^2$ and reaches a peak at a dose in the neighborhood of $10^{17}$ ions/cm$^2$. When the dose is further increased the surface roughness conversely tends to decrease and decreases again to 3 nm or less in the neighborhood of $10^{18}$ ions/cm$^2$. A surface roughness which exhibits good sliding characteristics falls in the range of 3 nm or more. In a thin film of about this thickness, usually, the surface roughness of the formed film is in accordance with the roughness of the undercoat film and is on nearly the same level as the latter. However, by application of ion irradiation as mentioned above, films are formed which have a rough surface even when the undercoat film is smooth. Although the result of surface roughness determination varies widely depending on the measuring instrument, measuring region and other conditions, values obtained with STM are shown in the present determination.

The magnetic recording medium thus prepared was tested for its reliability, and the results are described below. As to the problem of the resistance to sliding with a magnetic head, it is required that both the friction and abrasion of the recording medium at the start and stop and the adsorption (or sticking) thereof to the head during stoppage are respectively small. Since the CSS operation is usually done repeatedly in a magnetic disk apparatus, it is desired that the friction coefficient is low and does not change even in a large number of CSS operations. Therefore, the sliding resistance performance can be evaluated by the change of friction coefficient corresponding to the number of times of sliding. The dynamic friction coefficient $\mu$ of a head was determined by using a Winchester-type magnetic head slider with a thrusting load set at 10 gf and the results are shown in Table 1. In a non-irradiated medium, the coefficient $\mu$ is initially 0.26, then increases with increase in the number of times of CSS and increases to 0.58 at 10,000 times and further to as high as 0.92 at 50,000 times. In a medium in which a texture has been mechanically introduced in the Cr undercoat film, the dynamic friction coefficient $\mu$ is 0.23 or less up to the initial 1,000 times but increases rapidly thereafter and reaches 0.70 at 50,00 times. As contrasted thereto, in a medium into which a minute texture has been introduced by ion irradiation, the dynamic friction coefficient is initially 0.21, and is no more than 0.24 even after 50,000 times of CSS. Thus, the medium shows virtually no rise of the friction coefficient $\mu$ from the initial value and exhibits a stable sliding property. This is conceivably because the sliding resistance is improved and simultaneously the strength and hardness are increased, by ion irradiation.

TABLE 1

| | | Number of times of CSS | | | | | |
|---|---|---|---|---|---|---|---|
| | | Initial | 100 | 1000 | 10000 | 30000 | 50000 |
| Dynamic friction coefficient ($\mu$) | Non-irradiated medium | 0.26 | 0.35 | 0.42 | 0.58 | 0.79 | 0.92 |
| | Non-irradiated medium, mechanical texture on Cr undercoat film | 0.20 | 0.21 | 0.23 | 0.35 | 0.40 | 0.70 |
| | Ion-irradiated medium | 0.21 | 0.21 | 0.23 | 0.23 | 0.23 | 0.24 |

Then, to examine the adsorptive (or sticking) property of a head in a high humidity environment, the static friction coefficient $\mu s$ after standing at 90% RH at 25° C. for 1 week was determined, and the results are shown in Table 2. Though the coefficient $\mu s$ increases as compared with the initial value, the extent of increase is smaller in the ion-irradiated medium, which indicates a more excellent sticking property. It can be considered as the main reason therefor that introduction of minute roughness into the surface of the contact part exerts a great effect in decreasing stickiness. It can be further considered that the surface has been made hydrophobic by ion irradiation to contribute additionally to the effect.

TABLE 2

| | | Initial | After 7 days at 25° C. × 90% RH |
|---|---|---|---|
| Static friction coefficient ($\mu s$) | Non-irradiated medium | 0.60 | 1.30 |
| | Non-irradiated medium, mechanical texture on Cr undercoat film | 0.22 | 0.59 |
| | Ion-irradiated medium | 0.23 | 0.33 |

Then, the abrasion amount of the protective film of a magnetic recording medium due to sliding with a magnetic head was determined and the results are shown in Table 3.

TABLE 3

| | Mean abrasion depth (nm) at the part beneath head | | |
|---|---|---|---|
| | CSS 1000 | CSS 10000 | CSS 50000 |
| Non-ion-irradiated medium | <0.2 | 1.1 | 8.2 |
| Ion-irradiated medium | <0.2 | 0.8 | 1.1 |

It has been revealed that while the non-irradiated medium gives a mean abrasion depth of 8.2 nm after 50,000 times of CSS, the ion-irradiated medium gives the value of 1.1 nm, thus showing a markedly improved abrasion resistance. This is conceivably because, since nitride has been formed till deep into the protective film by ion irradiation, the surface properties change with difficulty even when the outermost surface is abraded to some extent, which retards the progress of abrasion.

According to the first Example, a texture can be introduced in the surface of a protective film and, simultaneously, hardening of the protective film and improvement of the adhesive property thereof to a magnetic film, etc., can be accomplished; resultantly, surfaces excellent in sliding resistance can be formed. Thus, the present invention provides excellent effects in lowering the friction coefficient, reducing the abrasion amount and reducing the stickiness. Further, it has the advantage of realizing uniform and stable quality products based on the simultaneous treatment of the both sides of the disk, simplification of the process and reduction of the cost.

Figure 7:
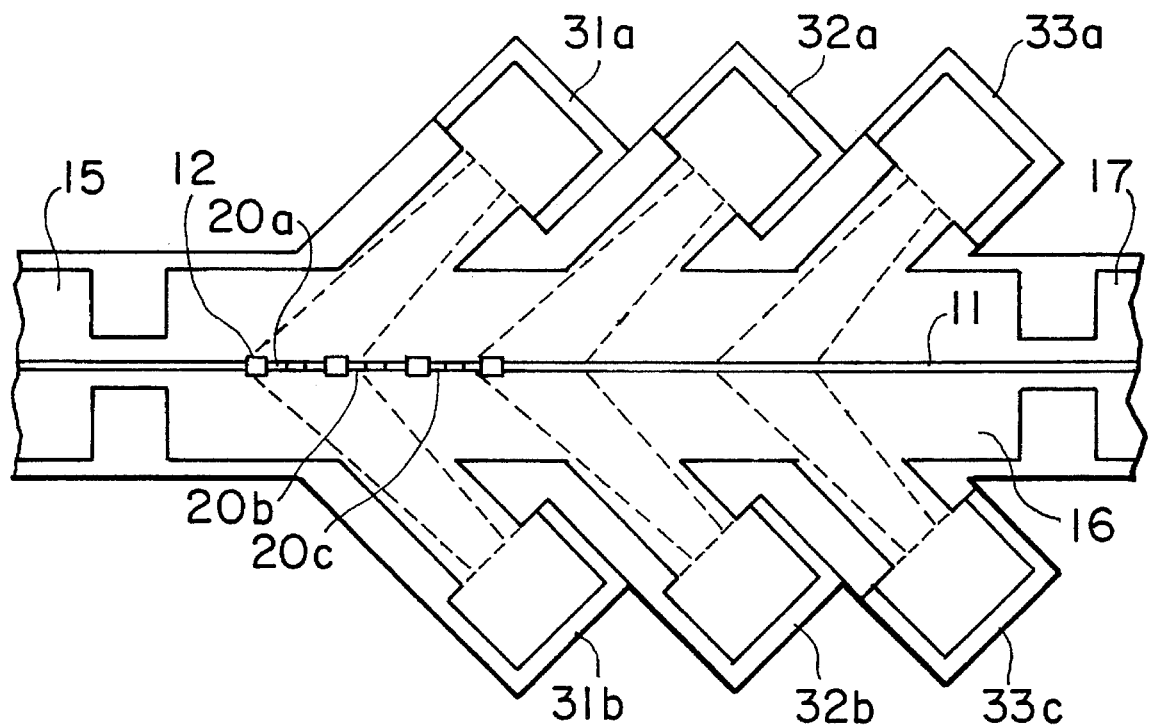
FIG. 7 is a top plan view showing an apparatus for production of the second Example.
Figure 8:
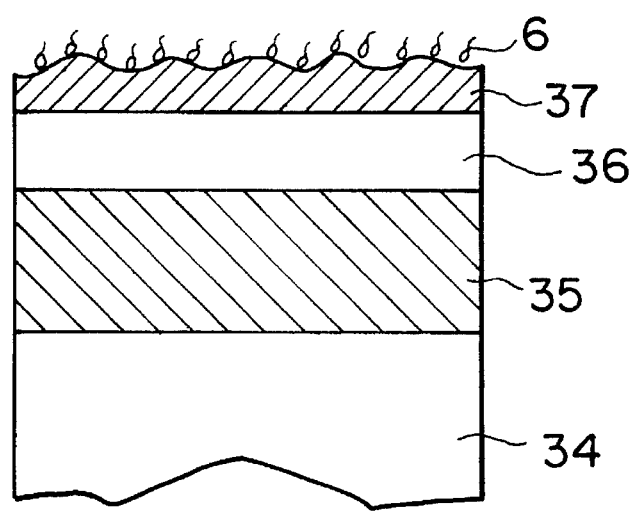
FIG. 8 is a diagram showing the film structure of the magnetic recording medium of the second Example.
Figure 9:
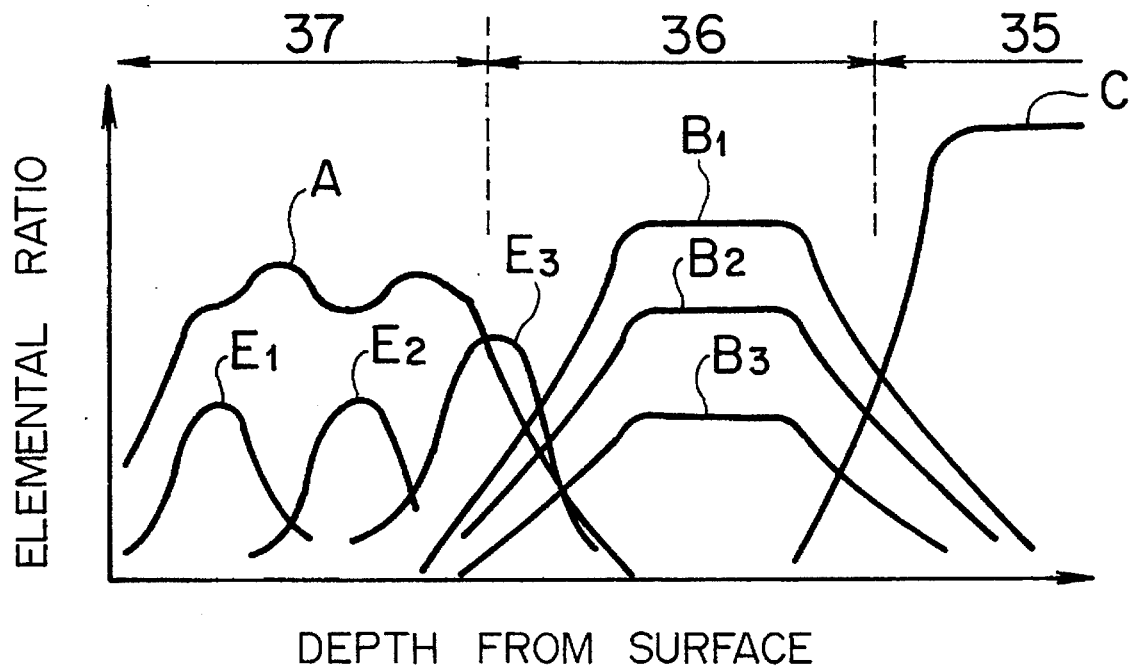
FIG. 9 is a graph showing the result of analysis of the composition in the depth direction of the magnetic recording medium of the second Example.
Figure 10:
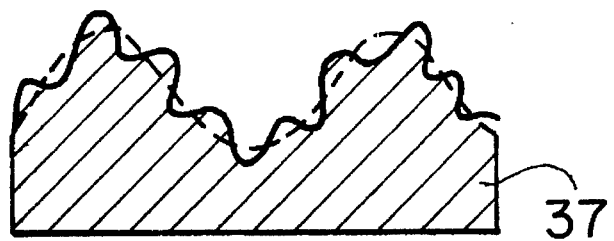
FIG. 10 is a schematic diagram showing the minute configuration formed on the surface in the second Example.

Nextly, the second Example will be described below with reference to FIGS. 7, 8, 9 and 10 and Table 4, mainly with respect to the differences from the first Example. FIG. 7 is a top plan view showing an apparatus for production of the second Example. FIG. 8 is a diagram showing the film structure of the magnetic recording medium produced. FIG. 9 is a graph showing the results of analysis of the composition in the depth direction of the magnetic recording medium. FIG. 10 is a diagram showing the minute configuration of the surface of the recording medium.

The recording medium, i.e., magnetic disk, of the present Example has the following film structure. As shown in FIG. 8, on a glass substrate 34 are formed an intermediate Cr film 35 of 40–300 nm thickness and, thereon, a Co-Cr-Pt based magnetic film 36 of 30–60 nm thickness respectively by means of sputtering, and formed further thereon a protective carbon film 37 of several nm thickness. FIG. 7 shows an apparatus for applying ion irradiation treatment to the protective film. The ion irradiation apparatus used herein is comprised of plural apparatuses commonly called "ion implantation apparatuses". On the left side of the drawing, is a sputtering film-forming chamber 15 for forming the films up to and including the protective carbon film of the magnetic recording medium. An ion irradiation chamber 16 is provided to be connected in line with the chamber 15, and further on the right side of the chamber, is a carrying-out chamber 17 for taking out a sample. Magnetic disks 20a, 20b and 20c each of a diameter of 5.25 inches, which are recording media, can be attached or detached as desired to or from a pallet 12 capable of moving on a rail 11 laid passing through these chambers. The sample is sent from the sputtering film-forming chamber 15 into the ion irradiation chamber 16 kept at a degree of vacuum of about $10^{-5}$ Torr and further transferred to the carrying-out chamber used for taking out the sample. Six ion sources are provided which can irradiate from both sides of the pallet 12 carrying the sample thereon and at an angle of about 45°. Ion sources 31a, 31b, 32a, 32b, 33a, and 33b are respectively set at 3 sets of irradiation conditions. The source 31 is to irradiate oxygen ions at an acceleration voltage of 15 kV, the source 32 to irradiate nitrogen ions at an acceleration voltage of 10 kV and the source 33 to irradiate silicon ions at an acceleration voltage of 5 kV. In the present Example, by irradiation at a certain angle of inclination, a more effective surface sputtering effect can be expected and further, by conducting plural times of implantation at different acceleration voltages, a rough configuration is imparted to the surface initially and then more minute roughness is introduced thereon; resultantly, surface configurations excellent in stickiness and sliding resistance can be formed. FIG. 10 shows schematically the configuration of texture formed when ion irradiation is applied a plural number of times. By irradiation at a high acceleration voltage, surface roughness with cycles of large intervals is formed; when ion irradiation is applied thereafter at a relatively low acceleration voltage, protuberances of particularly large size present in the initial roughness are shaved off and simultaneously a texture of minute surface roughness is overlapped thereon. Resultantly, a more effective configuration can be formed. FIG. 9 shows the result of analysis of the film structure resulting from ion irradiation treatment. After irradiation, a part of the atoms are implanted into the protective film to depths which vary depending on the acceleration voltage. Consequently, in the boundary part with the magnetic layer are present oxygen atoms denoted by $E_3$ in the Figure, in the slightly more shallow part nitrogen atoms denoted by $E_2$ and in the most shallow part silicon atoms denoted by $E_1$, respectively with a certain distribution. The magnetic disk further comprises a perfluoropolyether based lubricant 6 coated thereon. Table 4 shows the result of determination of changes in the friction coefficient of the magnetic disk of the present Example. The friction coefficient obtained is not only lower than in a non-irradiated disk but also lower than in the first Example, and can keep a low value of 0.2 even after 50,000 times of CSS.

TABLE 4

| | | Number of times of CSS | | | | | |
|---|---|---|---|---|---|---|---|
| | | Initial | 100 | 1000 | 10000 | 30000 | 50000 |
| Dynamic friction coefficient (μ) | Non-irradiated medium | 0.26 | 0.35 | 0.42 | 0.58 | 0.79 | 0.92 |
| | Ion-irradiated medium | 0.15 | 0.17 | 0.17 | 0.19 | 0.20 | 0.20 |

According to the second Example, a texture can be introduced into the surface of a protective film and, simultaneously, hardening of the film and improvement of the adhesive property thereof to a magnetic film, etc., can be accomplished; resultantly, surfaces excellent in sliding resistance can be formed. Furthermore, the layer denoted by $E_1$ has the effect of improving adhesion between the magnetic film and the protective film, the layer denoted by $E_2$ has the effect of forming nitrogen compounds to act as a moisture permeation preventive layer and thereby to enhance corrosion resistance, and the layer denoted by $E_3$ has the effect of enhancing surface hardness. Although the Examples above were described specifying the elements constituting the medium and the ion-irradiated elements, the essentials of the present invention lie in irradiating ions accelerated by high voltage to cause collision of atomic nuclei with atoms constituting the protective film, so that the elements used in embodying the present invention are not limited to those specified above. Further, a magnetic recording apparatus with high data reliability can be obtained by mounting in the recording apparatus the magnetic recording medium excellent in sliding resistance and weather resistance described above.

According to the present invention, a minute surface configuration can be formed by ion irradiation, and a magnetic recording medium with a high sliding resistance reliability can be obtained. Further, according to the present invention, magnetic recording media having a good sliding resistance characteristic can be produced continuously and in a stable manner. Furthermore, according to the present invention, a magnetic recording apparatus with a high reliability can be obtained which shows reduced sticking of the magnetic recording medium to the magnetic head during the stoppage of the recording medium.

What is claimed is:

1. A thin film magnetic recording medium comprising a magnetic film for data recording formed on a non-magnetic substrate and a non-magnetic protective film provided on the magnetic film, wherein the protective film comprises carbon atoms and has a center line surface roughness of not less than 3 nm and not more than 10 nm formed by irradiating a surface of the protective film with atomic ions, said atomic ions having an atomic weight larger than carbon, accelerated in an electric field of 4– 40 kV at a dose of $10^{15}$ to $10^{18}$ ions/cm$^2$.

2. A thin film magnetic recording medium according to claim 1, wherein the atomic ions are ions of at least one element selected from the group consisting of N, Ar, O and Si.

3. A thin film magnetic recording medium according to claim 1, wherein a perfluoroether based lubricant layer is provided on the protective film.

4. A thin film magnetic recording medium according to claim 1, wherein the magnetic film is a sputtered magnetic film formed on the non-magnetic substrate.

5. A thin film magnetic recording medium according to claim 1, wherein said center line surface roughness is formed by irradiating the surface of the protective film with the atomic ions while keeping the temperature of the non-magnetic substrate at 100°–240° C.

6. The thin film magnetic recording medium according to claim 2, wherein the at least one element is admixed with carbon constituting an upper portion of said protective film adjacent the surface thereof.

7. The thin film magnetic recording medium according to any one of claims 1, 2 and 3, wherein the center line surface roughness of the protective film is different from that of the magnetic film present thereunder.

8. The thin film magnetic recording medium according to claim 6, wherein the at least one element is distributed in a depth direction in said upper portion different from a distribution of the carbon, the at least one element having a concentration distribution near to a Gauss distribution in the depth direction in said upper portion.

* * * * *